United States Patent Office 3,717,490
Patented Feb. 20, 1973

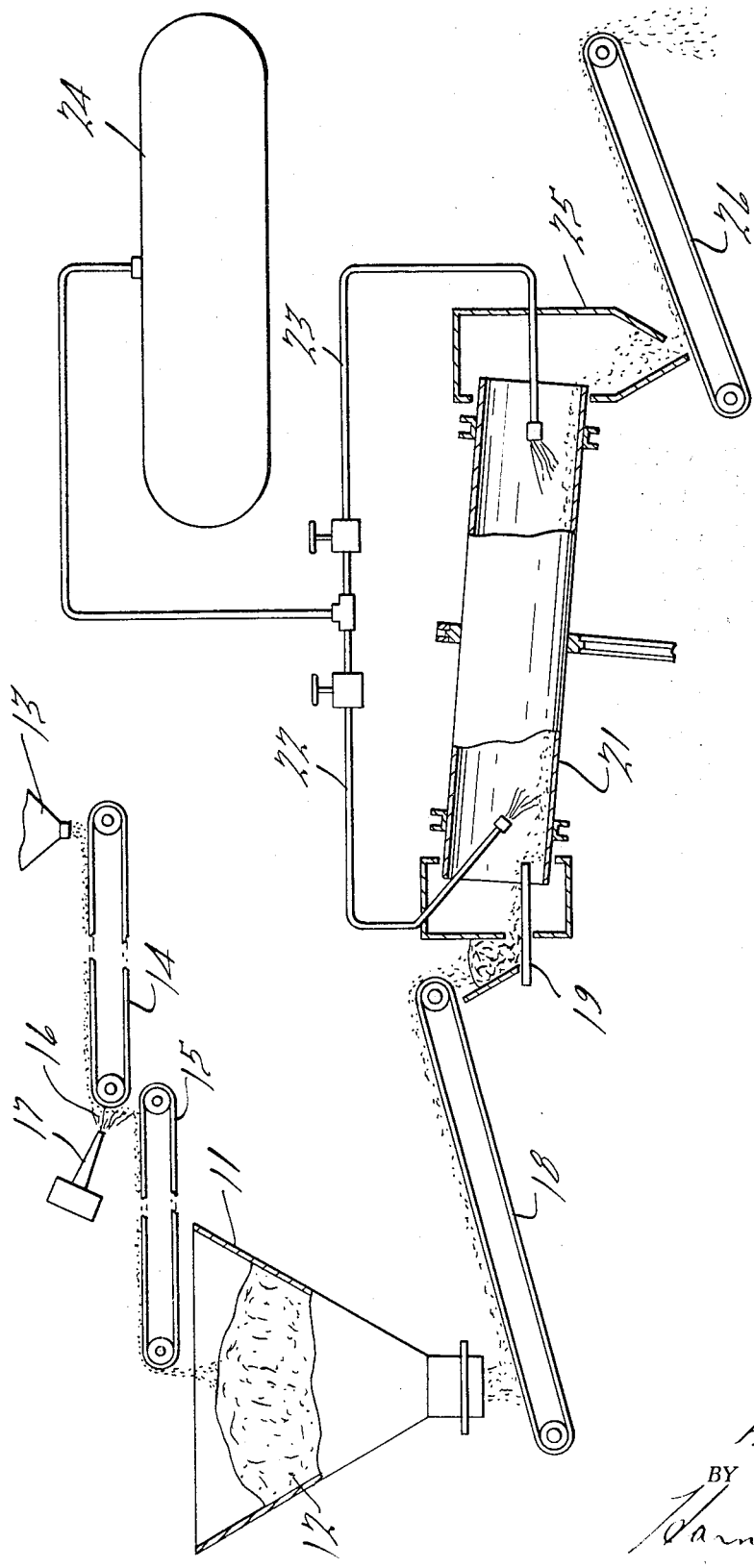

3,717,490
METHOD OF TREATING SLAG
Karl V. Hauser, Ann Arbor, Mich., assignor to Edward Levy Company, Detroit, Mich.
Filed Feb. 1, 1971, Ser. No. 111,380
Int. Cl. C04b 7/14
U.S. Cl. 106—117                 10 Claims

ABSTRACT OF THE DISCLOSURE

A method of treating steel furnace slag in order to convert unreacted calcium oxide and calcium hydroxide into a form which will not cause either volumetric expansion or leaching. Wet crushed slag is brought into contact with carbonate ions. The water hydrates the calcium oxide to form calcium hydroxide, and the calcium and carbonate ions combine to form calcium carbonate.

BACKGROUND OF THE INVENTION

Field of the invention

The invention relates to the treatment of raw slag having substantial amounts of calcium oxide or other alkali earth oxides which have insoluble carbonates, such as strontium or barium carbonate. Examples of such slag are the steel furnace slags produced by open hearth or oxygen furnace processes, and which are normally found to have about 2% of residual free lime.

Although blast furnace slag, which has no free lime, is commonly used in crushed and sized form as an aggregate base under concrete or bituminous paving, steel furnace slag has up to now been satisfactory for the purpose in limited instances. The reason for this is that the unreacted calcium oxide component of the steel furnace slag is often of such magnitude that, subsequent to placement, it will hydrate with water or with moisture from the air and form calcium hydroxide, expanding to such a degree that disruption can occur, causing heaving, sliding or localized popouts. Moreover, the combining of carbon dioxide found in the air with calcium hydroxide which is washed from the slag due to percolation through the paving base, will form limestone. This carbonation process could result in sedimentation in drainage courses, sewers and catch basins.

Description of the prior art

Eckdahl Pat. No. 1,693,644 discloses a wet process for manufacturing cement in which blast furnace slag is used, the patent disclosing the use of carbon dioxide gas blown through the slurry in order to prevent the hydration of the basic constituents of the slag and thus prevent setting of the slurry. Trief Pat. No. 2,819,172 discloses the use of carbon dioxide to dry granulated blast furnace slag in preparation for its use in cement. Fuller Pat. No. 1,608,499 discuses the aeration of cement with carbon dioxide to remove free lime and for other purposes, no water being added since this would set up the cement.

In no prior art known to applicant is there a suggestion of treating raw steel furnace slag having substantial amounts of calcium oxide and calcium hydroxide by introducing carbonate ions thereto in the presence of water to eliminate such constitutents and form carbonate therefrom.

SUMMARY OF THE INVENTION

According to the invention, steel furnace slag in particle form is intimately exposed to a water solution containing carbonate ions, causing the free lime to form calcium carbonate. The carbonate ions may be introduced in any of several ways, such as by the addition of a soluble carbonate salt in the presence of moisture, exposure of the slag to carbon dioxide gas, or the addition of limestone or dolomite and an acid to the slag. The resulting slag is entirely devoid of free lime or hydroxides, and may be safely used as an aggregate base under paving without the danger of causing disruption due to expansion, or causing sedimentation due to leaching.

BRIEF DESCRIPTION OF THE DRAWING

The drawing discloses a suitable apparatus in schematic form for carrying out the process of this invention.

DESCRIPTION OF THE PREFERRED EMBODIMENT

In carrying out the invention, the steel furnace slag, such as that produced by open hearth or oxygen furnaces, is mixed in particle form with water. The water will hydrate the calcium oxide or free lime in the slag to form calcium hydroxide. Additional water will dissolve the calcium hydroxide present, dissociating part of it into calcium and hydroxyl ions. The calcium ions thus liberated are combined with the carbonate ions introduced according to this invention to form calcium carbonate. This reaction will form more water. The total reaction will thus cause a progressive dissociation of the calcium hydroxide into calcium and hydroxyl ions.

The specific amount of carbonate ions present during the process is not crucial as long as there is a surplus available to combine with the calcium ions. The amount of water present during the process seems to play a critical roll in the effectiveness of carbonation. Too little water does not dissociate enough ions from the calcium hydroxide present. The diluting effect of too much water will severely inhibit the ion exchange action. The water should be sufficient to cover the surfaces of all the particles being treated. The size of the particles will thus have a bearing on the amount of water required, larger particles requiring less water.

Temperature is a factor as well because very warm temperatures reduce the solubility of calcium hydroxide, thus decreasing the amount of calcium ions available for ion exchange. The temperature must be kept above the freezing point of water to allow hydration and dissociation to proceed.

The carbonate ions may be introduced in any of several ways. These would include, for example, the addition to the slag in the presence of moisture of a soluble carbonate salt, such as sodium carbonate, potassium carbonate, sodium bicarbonate, ammonium carbonate or ammonium bicarbonate. Another way of introducing the carbonate ions would be by exposure of the slag to carbon dioxide gas in the presence of moisture. A third method of introduction of carbonate ions would be the addition of limestone or dolomite and an acid to the slag. Chemical equations illustrating the three methods are as follows:

(a) $Na_2CO_3 + H_2O \rightarrow 2Na^+ + CO_3^= + H_2O$
(b) $CaO + H_2O \rightarrow Ca(OH)_2$
(c) $Ca(OH)_2 + H_2O \rightarrow Ca^{++} + 2OH^- + H_2O$
(d) $Ca^{++} + CO_3^= \rightarrow CaCO_3$ (2) Carbon dioxide exposure:

(a) $CO_2 + 3H_2O \rightarrow 2H_3O^+ + CO_3^=$
(b) $CaO + H_2O \rightarrow Ca(OH)_2$
(c) $Ca(OH)_2 + H_2O \rightarrow Ca^{++} + 2OH^- + H_2O$
(d) $Ca^{++} + CO_3^= \rightarrow CaCO_3$
(e) $H_3O^+ + OH^- \rightarrow 2H_2O$ (3) Limestone and acid addition:

(a) $H_2SO_4 + 2H_2O \rightarrow 2H_3O^+ + SO_4^=$ (b) $CaCO_3 + SO_4^= + 2H_3O^+ \rightarrow CaSO_4 + CO_2 + 3H_2O$
(c) $CO_2 + 3H_2O \rightarrow 2H_3O^+ + CO_3^=$
(d) $CaO + H_2O \rightarrow Ca(OH)_2$
(e) $Ca(OH)_2 + H_2O \rightarrow Ca^{++} + 2OH^- + H_2O$
(f) $Ca^{++} + SO_4^= \rightarrow CaSO_4$
(g) $Ca^{++} + CO_3^= \rightarrow CaCO_3$
(h) $H_3O^+ + OH^- \rightarrow 2H_2O$ In summary, the basic materials of the process consist of raw slag having substantial amounts of calcium oxide and calcium hydroxide, water, and a carbonate ion source. In carrying out the invention, the raw slag is converted to one relatively free of lime, the lime being converted to an insoluble product with non-expansive properties.

The drawing illustrates a suitable apparatus for carrying out the process of this invention. A slag feed bin is indicated at 11, the steel furnace slag 12 in particle form being disposed therein. One way in which water may be added to the slag is by means of a dust collection process, conventional in itself, which is employed during transfer of the crushed slag to bin 11. The crushing apparatus is indicated schematically at 13, the slag being transferred to bin 11 by a series of conveyor belts two of which are shown at 14 and 15. As part of the dust collection process, water 16 is sprayed on the slag at the transfer points between the conveyor belts by a nozzle 17. The slag in bin 11 will thus be damp. The amount of water added to the slag will be sufficient to hydrate the calcium oxide to form calcium hydroxide, and to further dissolve the calcium hydroxide as described above into calcium and hydroxyl ions.

The slag is transferred by a conveyor 18 to the feeder 19 of a rotary reactor 21. Carbon dioxide is fed into opposite ends of this reactor by pipes 22 and 23 fed from a tank 24 of gaseous or liquid carbon dioxide. The carbonate ions in the carbon dioxide will react with the liberated calcium ions in the slag to form calcium carbonate (limestone). The slag in the rotary reactor will normally gain temperature because of the reaction taking place therein, but no extraneous heat will be added. The treated slag will then be discharged from the reactor at 25 onto a conveyor 26 leading to the stockpile.

What is claimed is:

1. A process for converting raw steel furnace slag into stable fill material which comprises the steps of:
   (1) providing a steel furnace slag having substantial amounts of calcium oxide and calcium hydroxide therein,
   (2) contacting said slag with water in a manner which hydrates the calcium oxide to form calcium hydroxide and dissociates part of the calcium hydroxide into calcium and hydroxyl ions in aqueous solution, and
   (3) introducing carbonate ions in an amount sufficient to react with substantially all of the calcium hydroxide ions present to form an insoluble aqueous calcium carbonate precipitate which renders said treated slag stable and resistant to leaching or expansion when used as an aggregate base under paving.

2. The process according to claim 1, in which the amount of water added is more than enough to dissociate the calcium hydroxide but less than that which would severely inhibit the ion exchange action.

3. The process according to claim 2, the temperature being below that which would substantially reduce the solubility of the calcium hydroxide but above the freezing point of water, so as to allow hydration and dissociation to proceed.

4. The process according to claim 1, in which the carbonate ions are introduced by the addition to the slag of a soluble carbonate salt.

5. The process according to claim 4, said soluble carbonate salt being soduim carbonate.

6. The process according to claim 4, said soluble carbonate salt being chosen from the class containing sodium carbonate, potassium carbonate, sodium bicarbonate, ammonium carbonate and ammonium bicarbonate.

7. The process according to claim 1, the carbonate ions being introduced by exposure of the slag to carbon dioxide gas.

8. The process according to claim 1, in which the carbonate ions are introduced by the addition of limestone or dolomite and an acid to the slag.

9. The process according to claim 8, said acid being sulphuric acid.

10. In a process for preparing steel furnace slag for use as an aggregate base under paving, the steps of crushing said slag to particle form, conveying said particulate slag to a bin, dampening said slag with water while being so conveyed so as to collect dust and to add water in sufficient amount to hydrate the calcium oxide in the slag to form calcium hydroxide and to dissolve the calcium hydroxide so as to dissociate part of it into calcium and hydroxyl ions, conveying said damp slag from the bin to a rotary reactor, mixing the slag particles with carbon dioxide while in said rotary reactor so that the carbonate ions in the carbon dioxide gas will combine with the liberated calcium ions to form calcium carbonate, and removing the treated slag from said reactor.

References Cited
UNITED STATES PATENTS 617,241    1/1899    Elbers    106—117
2,687,969    8/1954    Trief    106—117

JAMES E. POER, Primary Examiner

U.S. Cl. X.R.

106—288 B